J. G. Kimberlin.
Hay Fork.
No. 87,051.  Patented Feb. 16, 1869.
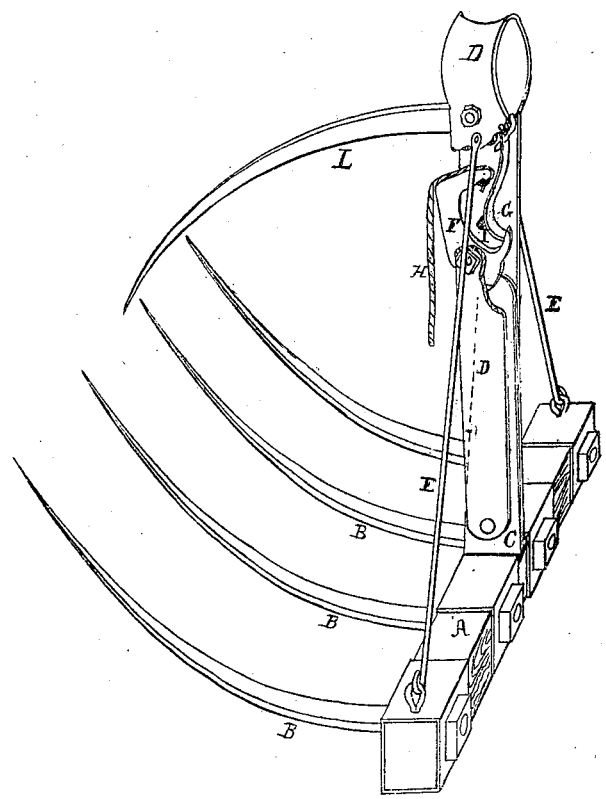
Witnesses
Harry King
Leopold Quest
Inventor
John G. Kimberlin
by Alexander & Mason
Attys.

JOHN G. KIMBERLIN, OF WEST DRYDEN, NEW YORK.

Letters Patent No. 87,051, dated February 16, 1869.

IMPROVEMENT IN HORSE HAY-FORKS.

The Schedule referred to in these Letters Patent and making part of the same.

*To all whom it may concern:*

Be it known that I, JOHN G. KIMBERLIN, of West Dryden, in the county of Tompkins, and in the State of New York, have invented a new and useful Improvement in Horse Hay-Forks; and do hereby declare that the following is a full, clear, and exact description thereof, reference being had to the accompanying drawings, and to the letters of reference marked thereon.

The nature of my invention consists in the construction and general arrangement of a "horse hay-fork," which may be used as well for loose grain as for hay.

In order to enable others skilled in the art to which my invention appertains, to make and use the same, I will now proceed to describe its construction and operation, referring to the annexed drawings, which form a part of this specification, and represent a perspective view of my invention.

A represents the beam or head of a hay-fork, to which two or more tines B B are firmly bolted.

These tines are bent upward, so as to be at an angle of less than ninety degrees from the shank C, which extends upward from the centre of the head A.

The handle D, which consists of a metal bar or plate, bent down on each side of the shank, is pivoted to the said shank at its lower end, near head A, so that the crank C works inside of the same.

From the upper part of the handle D, braces E E extend to the ends of the head A, giving additional strength to the fork.

When the fork is being raised up, a catch, F, which is pivoted inside of the handle D, holds the shank C, and, consequently, the whole fork, in its proper position.

A spring, G, placed inside of the handle, and pressing against a hook in the rear part of the catch, keeps the same always in proper position to lock and hold the shank, thus making the fork self-setting.

The upper end of the shank C, and that part of the catch on which the shank catches, are both cut upon the same circle, so that the friction between the two surfaces is the only resistance to be overcome by the trip-cord H, which is attached to the upper end of the catch, and will be pulled when it is desired to release the shank and trip the fork.

Under the lower end of the spring G, and at a suitable distance from the hook mentioned, on the rear part of the catch, is a rivet, I, passing through the handle D, against which rivet the catch strikes, when pulled far enough to release the shank, thereby preventing the catch from going further than is actually necessary.

The rivet I is provided with a thimble, which prevents the two sides constituting the handle from coming too close together.

In the upper part of the handle, I place a spur or tine, L, which may be dispensed with, if desired.

It is not needed in hay, but is very useful in loose grain.

This hay-fork is calculated to go up with the back toward the mow. It takes good loads, does not spill, and dumps perfectly, even if the rope twists, and the fork turns quite around after passing over the beam. This is a valuable quality, and one hardly to be found in any fork now in use.

Having thus fully described my invention,

What I claim as new, and desire to secure by Letters Patent, is—

The arrangement of the head A and its tines B B, handle D, braces E E, catch F, spring G, and movable tine I, all constructed and operated substantially as herein set forth.

In testimony that I claim the foregoing, I have hereunto set my hand, this 25th day of July, 1868.

JOHN G. KIMBERLIN.

Witnesses:
LUCIUS S. WARRINER,
JOHN W. WEBSTER.